(12) United States Patent
Lee et al.

(10) Patent No.: US 10,000,001 B2
(45) Date of Patent: Jun. 19, 2018

(54) INJECTION MOLDING MACHINE AND MOLD THICKNESS CONTROL METHOD

(71) Applicant: LS MTRON LTD., Anyang-si, Gyeonggi-do (KR)

(72) Inventors: Sun-Woo Lee, Gunpo-si (KR); Hyeon-Jae Yu, Ansan-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 247 days.

(21) Appl. No.: 14/962,323

(22) Filed: Dec. 8, 2015

(65) Prior Publication Data

US 2016/0185023 A1    Jun. 30, 2016

(30) Foreign Application Priority Data

Dec. 24, 2014  (KR) .................. 10-2014-0187779

(51) Int. Cl.
*B29C 45/64* (2006.01)
*G05B 19/18* (2006.01)
(Continued)

(52) U.S. Cl.
CPC .............. *B29C 45/64* (2013.01); *B29C 45/76* (2013.01); *G05B 19/182* (2013.01); *G05B 19/402* (2013.01); *B29C 45/1751* (2013.01); *B29C 45/7653* (2013.01); *B29C 2945/76083* (2013.01); *B29C 2945/76227* (2013.01);
(Continued)

(58) Field of Classification Search
CPC ..... B29C 45/64; B29C 45/76; B29C 45/1751; B29C 2945/76866; B29C 2945/76505; B29C 2945/76431; B29C 2945/76227; B29C 2945/76083; B29C 45/7653; G05B 19/402; G05B 19/182; G05B 2219/45244
See application file for complete search history.

(56) References Cited

U.S. PATENT DOCUMENTS 7,804,268 B2 *  9/2010  Park .................... B29C 45/76
                                                           318/600
9,022,767 B2 *  5/2015  Oono .................. B29C 45/1751
                                                           425/150
(Continued)

FOREIGN PATENT DOCUMENTS

JP         3276727 B2    4/2002
JP      2009-208412 A    9/2009
(Continued)

*Primary Examiner* — Ramesh Patel
(74) *Attorney, Agent, or Firm* — K&L Gates LLP (57) ABSTRACT

The injection molding machine includes a fixed platen, a moveable platen moving forward and backward by a toggle link, a base plate supporting the toggle link, a driving part for mold clamping to operate the toggle link, a driving part for mold thickness adjustment to adjust a mold thickness, and a control unit to calculate a movement distance gap before a clamping process by controlling the driving part for mold thickness adjustment to move the base plate backward and then move the base plate forward to a target movement position based on a fold amount of the toggle link, and control the driving part for mold thickness adjustment using a value obtained by deducting the movement distance gap from the fold amount of the toggle link when producing a clamp force.

12 Claims, 3 Drawing Sheets

(51) Int. Cl.
    *B29C 45/76*       (2006.01)
    *G05B 19/402*    (2006.01)
    *B29C 45/17*       (2006.01)

(52) U.S. Cl.
    CPC ............ *B29C 2945/76431* (2013.01); *B29C 2945/76505* (2013.01); *B29C 2945/76866* (2013.01); *G05B 2219/45244* (2013.01)

(56) References Cited

U.S. PATENT DOCUMENTS

| | | | |
|---|---|---|---|
| 9,090,016 B2 * | 7/2015 | Takeuchi | B29C 45/83 |
| 9,108,352 B2 * | 8/2015 | Takeuchi | B29C 45/83 |
| 9,296,144 B2 * | 3/2016 | Murata | B29C 45/572 |
| 9,566,732 B2 * | 2/2017 | Shioiri | B29C 45/1744 |
| 2002/0022069 A1 * | 2/2002 | Kasal | B29C 45/1761 |
| | | | 425/593 |
| 2003/0039719 A1 * | 2/2003 | Armbruster | B29C 45/661 |
| | | | 425/593 |
| 2005/0098912 A1 * | 5/2005 | Haruo | B29C 45/7653 |
| | | | 264/40.1 |
| 2008/0211126 A1 * | 9/2008 | Kobayashi | B29C 45/7653 |
| | | | 264/40.5 |
| 2009/0026644 A1 * | 1/2009 | Masuda | B29C 45/76 |
| | | | 264/40.1 |
| 2012/0146260 A1 * | 6/2012 | Murata | B29C 45/572 |
| | | | 264/328.1 |
| 2014/0134284 A1 * | 5/2014 | Oono | B29C 45/1751 |
| | | | 425/144 |

FOREIGN PATENT DOCUMENTS

| | | |
|---|---|---|
| JP | 2013132796 A | 7/2013 |
| KR | 10-0512595 B1 | 9/2005 |

\* cited by examiner

INJECTION MOLDING MACHINE AND MOLD THICKNESS CONTROL METHOD

CROSS-REFERENCE TO RELATED APPLICATION

This application claims priority to Korean Patent Application No. 10-2014-0187779 filed in Republic of Korea on Dec. 24, 2014, the entire contents of which are incorporated herein by reference.

BACKGROUND OF THE INVENTION

1. Field of the Invention

The present disclosure relates to an injection molding machine, and more particularly, to a toggle type injection molding machine.

2. Description of Related Art

An injection molding machine is used to produce molded products by injecting melted resin from an injection unit and filling the same in a cavity of a molding unit, followed by solidification. The molding unit is composed of a fixed mold and a moveable mold. Mold closing and mold opening of the molding unit is performed by a clamping unit. The clamping unit of the toggle type injection molding machine includes a moveable platen, a fixed platen, and a driving source such as a motor and a toggle link to move the moveable platen.

A general injection mode of the injection molding machine is as follows. First, the moveable platen of the clamping unit in mold open state is moved toward the fixed platen at a high speed. When the moveable mold installed on the moveable platen comes into contact with the fixed mold installed on the fixed platen as the moveable platen moves, the pressure increases to produce a clamp force. A nozzle of the injection unit is moved forward to the mold to inject resin, followed by cooling. Subsequently, the moveable platen of the clamping unit is moved backward to separate the moveable mold from the fixed mold, and finally, the moveable platen is moved backward quickly to eject an injection molded product.

In the toggle type injection molding machine, a detailed description of a process of applying the clamp force to the mold is provided as follows. First, after the toggle link becomes maximum unfolded state, a plate supporting the toggle link is moved forward until the moveable mold mounted on the moveable platen comes into contact with the fixed mold mounted on the fixed platen. In this state, the moveable platen is moved backward as much as a predetermined dimension. As a result, the toggle link becomes a folded state at a predetermined amount. Subsequently, the plate supporting the toggle link is moved forward as much as a predetermined dimension. Subsequently, in a state that the plate is stopped, when the toggle link is unfolded to the maximum, tie bars fixed to the plate and the fixed platen are stretched, and in this instance, a clamp force is generated by a restoration force of the tie bars.

Mold thickness control is to adjust the position of the moveable platen when generating the clamp force to the mold in the injection molding machine. As the toggle type injection molding machine is an injection molding machine using the toggle link of a link structure that expands and transmits a force, mold thickness is adjusted by position adjustment of the moveable platen and the plate used to support and move the toggle link. However, a motor with low precision, for example, a 3-phase induction motor, may be used as a motor used to adjust the position of the plate, and in this case, it is difficult to precisely adjust the position of the plate. For example, although the plate was moved forward 1 mm, the plate actually went further in some instances. Also, although a high precision motor is used, reduction ratios differ in each model of the injection molding machine, causing a difference in precision.

SUMMARY OF THE INVENTION

The present disclosure is designed to solve the above problem, and therefore the present disclosure is directed to providing a mold thickness control method for precisely controlling a mold thickness in an injection molding machine with a toggle type clamping unit and an injection molding machine therefor.

To achieve the object, an injection molding machine according to one aspect of the present disclosure includes a fixed platen on which a fixed mold is mounted, a moveable platen disposed facing the fixed platen and installed moveably forward and backward by a toggle link, the moveable platen on which a moveable mold is mounted facing the fixed mold, a base plate supporting the toggle link and installed moveably forward and backward, a driving part for mold clamping to operate the toggle link, a driving part for mold thickness adjustment to adjust a mold thickness by moving the base plate forward and backward in relation to the fixed platen, and a control unit to calculate a movement distance gap before a clamping process by controlling the driving part for mold thickness adjustment to move the base plate backward and then move the base plate forward to a target movement position based on a fold amount of the toggle link, and control the driving part for mold thickness adjustment using a value obtained by deducting the movement distance gap from the fold amount of the toggle link when producing a clamp force.

The control unit may calculate the movement distance gap as many as a predetermined number of times, and determine an average value as a final movement distance gap.

The control unit may turn on the driving part for mold thickness adjustment to move the base plate forward to the target movement position, and when the base plate reaches the target movement position, turn off the driving part for mold thickness adjustment and determine a difference between a current position of the base plate and the target movement position as the movement distance gap.

The driving part for mold thickness adjustment may be a 3-phase induction motor, and the control unit may collect measured information from a sensor which measures a number of rotations of the 3-phase induction motor and calculate a position of the base plate.

The control unit may control the 3-phase induction motor by supplying power to the 3-phase induction motor or blocking the power supply through a magnetic contact.

The control unit may control the driving part for mold clamping and the driving part for mold thickness adjustment to fully unfold the toggle link so that the moveable mold comes into contact with the fixed mold and the toggle link becomes a folded state at a predetermined amount, and control the driving part for mold thickness adjustment to move the base plate forward as much as a value obtained by deducting the movement distance gap from the fold amount of the toggle link to produce a clamp force.

To achieve the object, according to one aspect of the present disclosure, a mold thickness control method for an injection molding machine including a fixed platen on which a fixed mold is mounted, a moveable platen disposed facing the fixed platen and installed moveably forward and backward by a toggle link, the moveable platen on which a moveable mold is mounted facing the fixed mold, and a base plate supporting the toggle link and installed moveably forward and backward, the mold thickness control method including receiving an input of a fold amount of the toggle link from a user, before a clamping process, calculating a movement distance gap by moving the base plate backward and moving the base plate forward to a target movement position based on the fold amount of the toggle link, and when producing a clamp force, moving the base plate forward using a value obtained by deducting the movement distance gap from the fold amount of the toggle link.

The calculating may include calculating the movement distance gap as many as a predetermined number of times, and determining an average value as a final movement distance gap.

The calculating may include turning on the driving part for mold thickness adjustment which moves the base plate forward and backwards, to move the base plate backward and then move the base plate forward to the target movement position, turning off the driving part for mold thickness adjustment when the base plate reaches the target movement position, and determining a difference between a current position of the base plate after turned off and the target movement position as the movement distance gap.

The calculating and the moving forward may include moving the base plate using a 3-phase induction motor, and collecting measured information from a sensor which measures a number of rotations of the 3-phase induction motor, and calculating a position of the base plate.

The moving forward may include fully unfolding the toggle link so that the moveable mold comes into contact with the fixed mold, controlling the toggle link so that the toggle link becomes a folded state at a predetermined amount, and moving the base plate forward as much as a value obtained deducting the movement distance gap from the fold amount of the toggle link to produce a clamp force.

DETAILED DESCRIPTION

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Figure 1:
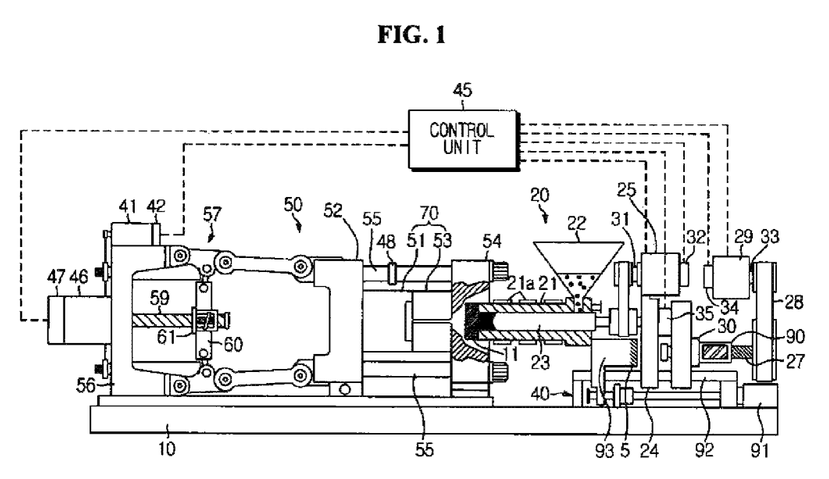
FIG. 1 is a diagram illustrating an example of an injection molding machine to which the present disclosure is applied.

FIG. 1 is a schematic diagram illustrating components of a screw-type electric injection molding machine as an example of an injection molding machine to which the present disclosure is applied.

The injection molding machine shown in FIG. 1 includes a frame 10, an injection unit 20 placed on the frame 10, and a clamping unit 50.

The injection unit 20 has a heating cylinder 21 where a hopper 22 is installed. A heater 21a is installed on the outer periphery of the heating cylinder 21 to heat the heating cylinder 21. A screw 23 is installed moveably forward/backward and rotatably inside the heating cylinder 21. A rear end of the screw 23 is rotatably supported by a driving support part 24.

A metering motor 25, for example a servo motor, is mounted as a driving part on the driving support part 24. The rotation of the metering motor 25 is transmitted to the screw 23 through a timing belt 26 mounted on an output shaft 31. A rotation detector 32 is connected to a rear end of the output shaft 31 as a rotation detection sensor to detect the number of rotations or an amount of rotation of the metering motor 25. The rotation detector 32 detects a rotation speed of the screw 23 by detecting the number of rotations or an amount of rotation of the metering motor 25.

The injection unit 20 has a ball screw shaft 27 parallel to the screw 23. The ball screw shaft 27 is screw-connected with a ball screw nut 90 to construct a movement direction conversion tool which converts a rotational motion to a linear motion. When an injection motor 29 as a driving part operates to rotate the ball screw shaft 27 through the timing belt 28, the driving support part 24 and a support 30 fixed to the ball screw nut 90 moves forward/backward. As a result, the screw 23 as a driven part may be moved forward/backward.

A position detector 34 as a position detection sensor connected to a rear end of an output shaft 33 of the injection motor 29 detects a position of the screw 23 representing an operating state of the screw 23 by detecting the number of rotations or an amount of rotation of the injection motor 29. Also, a resin pressure detecting load cell 35 is provided between the driving support part 24 and the support 30 as a pressure detection device to detect the pressure (reaction force) of melt resin applied to the screw 23.

The injection unit 20 has a plasticization movement device 40 as a driving tool which operates the injection unit 20 to apply the nozzle touch pressure. The plasticization movement device 40 includes a plasticization movement driving part 91 and an injection unit guide part 92. The injection unit guide part 92 is engaged with the driving support part 24, the support 30 and a front flange 93 that constitute the injection unit 20. Thus, as the plasticization movement driving part 91 operates, the injection unit 20 including the heating cylinder 21 may horizontally move on the frame 10 of the injection molding machine along the injection unit guide part 92. The plasticization movement device 40 operates to move the injection unit 20 forward at predetermining timing to cause a nozzle of the heating cylinder 21 to come into contact with a fixing mold 53, leading to a nozzle touch.

The heating cylinder 21 is supported by the front flange 93. A contact part 5 is installed at a rear end of the front flange 93, serving as a regulation means for limiting the forward or backward movement of the screw 23. When the screw 23 is in most forward state, the contact part 5 may be a stopper for regulating the forward movement to prevent a front end of the screw 23 from being damaged due to contact with a nozzle part (not shown) provided in front of the heating cylinder 21. Thereby, within the stroke forward movement limit of the screw 23, the contact part 5 comes into contact with the driving support part 24. A reaction force of an overall axial force imparted by the injection motor 29 is detected by the resin pressure detecting load cell 35. The contact part 5 is not necessarily installed at the rear end of the front flange 93, and a rear end of the heating cylinder 21 may serve as the contact part 5.

The metering motor 25, the rotation detector 32, the injection motor 29, the position detector 34, and the resin pressure detecting load cell 35 are connected to a control unit 45. Detected signals outputted from the rotation detector 32, the position detector 34, and the load cell 35 are transmitted to the control unit 45. The control unit 45 controls the operation of the metering motor 25 and the injection motor 29 based on the detected signals. In this instance, the control unit 45 may be installed singularly, and may be installed as a portion of a control part which controls the overall control of the injection molding machine.

The clamping unit 50 includes a fixed platen 54 as a fixed mold supporting apparatus fixed to the frame 10, and a toggle support 56 as a base plate installed movably with respect to the frame 10, spaced apart a predetermined distance from the fixed platen 54. The toggle support 56 acts as a toggle type clamping unit supporting device, and in particular, supports a toggle link 57 to move the toggle link 57 and a moveable platen 52 forward/backward. A tie bar 55 extends as multiple (for example, four) guide means between the fixed platen 54 and the toggle support 56.

The moveable platen 52 acts as a moveable mold supporting apparatus installed facing the fixed platen 54 and moveably forward/backward (leftward/rightward in the drawing) along the tie bars 55, and as the moveable platen 52 moves along the tie bars 55 by the operation of the toggle link 57, mold closing, mold clamping, and mold opening is accomplished.

A molding unit 70 includes a fixed mold 53 and a moveable mold 51. The fixed mold 53 is mounted on a mold mounting surface of the fixed platen 54 facing the moveable platen 52. The moveable mold 51 is mounted on a mold mounting surface of the moveable platen 52 facing the fixed platen 54.

The toggle link 57 is mounted as a toggle type clamping apparatus between the moveable platen 52 and the toggle support 56. A clamping motor 46 is installed at a rear end of the toggle support 56 as a driving part for mold clamping to operate the toggle link 57. The clamping motor 46 has a movement direction conversion apparatus (not shown) which converts a rotational motion to a linear motion, including a ball screw tool, so as to move a ball screw shaft 59 forward/backward (leftward/rightward in the drawing) to operate the toggle link 57. Here, the clamping motor 46 is preferably a servo motor, and has a mold closing/opening position sensor 47 as an encoder which detects the number of rotations or an amount of rotation.

The clamping motor 46 as a driving part for mold clamping operates to move a crosshead 60 forward/backward to operate the toggle link 57. In this case, when the crosshead 60 moves forward (rightward in the drawing), the moveable platen 52 as a driven park moves forward and mold closing is accomplished. Also, a clamp force corresponding to a propulsive force by the clamping motor 46 multiplied by toggle magnification is produced, and mold clamping is accomplished by the clamp force.

Above a rear end of the toggle support 56, a mold thickness motor 41 is installed as a driving part for adjusting the mold thickness. Here, the mold thickness motor 41 may be a 3-phase induction motor. The mold thickness motor 41 has a clamping position sensor 42 as an encoder which detects the number of rotations or an amount of rotation. That is, the clamping position sensor 42 senses a position of the toggle support 56 by detecting the number of rotations or an amount of rotation of the mold thickness motor 41.

Also, in this embodiment, a clamp force sensor 48 is installed as a pressure detector on one tie bar 55. The clamp force sensor 48 is a sensor which detects distortion (usually, stretching) of the tie bar 55. During mold clamping, a tensile force is applied to the tie bar 55 in response to the clamp force and the tie bar 55 is stretched in proportion to the clamp force. Thus, when an amount of stretch of the tie bar 55 is detected by the clamp force sensor 48, a clamp force being actually applied to the molding unit 70 may be detected. Upon contact of the fixed mold 53 and the moveable mold 51, a reaction force of an overall axial force imparted by the clamping motor 46 as a driving part is detected by the clamp force sensor 48 as a pressure detector. That is, because the forward motion of the moveable platen 52 is regulated by the fixed mold 53, the fixed mold 53 serves as a regulation means.

The clamp force sensor 48, the clamping position sensor 42, the clamping motor 46 and the mold thickness motor 41 are connected to the control unit 45, and measured signals outputted from the clamp force sensor 48 and the clamping position sensor 42 are transmitted to the control unit 45. The control unit 45 controls the operation of the clamping motor 46 and the mold thickness motor 41 based on the measured signals.

Hereinafter, the operation of the injection molding machine having the above described components during molding is described.

(1) Calculation of a Movement Distance Gap

In the setting of a clamp force during a mold clamping process, when the mold thickness motor 41 operates to move the toggle support 56 as a base plate forwards according to instructions of the control unit 45, the toggle support 56 does not stop immediately with the stop command of the control unit 45 and goes further a predetermined distance. As a result, a clamp force greater than a target clamp force occurs. Thus, when setting the clamp force, for the purpose of precise clamp force setting, there is a need to calculate and reflect a movement distance gap of the toggle support 56. A method of calculating the movement distance gap is as follows.

The control unit 45 receives an input of the number of repetitions and a fold amount of the toggle link for calculating a movement distance gap from a user. Here, the fold amount of the toggle link refers to a distance at which the toggle support 56 is moved when setting the clamp force, and is determined based on the clamp force. For example, when the clamp force is 30 tons, the fold amount of the toggle link may be 1 mm. A process of moving the toggle support 56 when setting the clamp force is described in detail as below.

The control unit 45 calculates a position to which the toggle support 56 will move based on the fold amount of the toggle link. That is, the control unit 45 may detect a current position of the toggle support 56 through the clamping position sensor 42, and calculates a target movement position by adding the fold amount of the toggle link to the current position. When the position is calculated with respect to the fixed mold 53, the target movement position is calculated as a value obtained by deducting the fold amount of the toggle link from the current position.

The control unit 45 operates the mold thickness motor 41 to move the toggle support 56 forward, compares a measurement value of the clamping position sensor 42 as an encoder which detects the number of rotations of the mold thickness motor 41 to the target movement position, and when the toggle support 56 reaches the target movement position, stop the operation of the mold thickness motor 41. However, as described above, even though the mold thickness motor 41 is stopped, the toggle support 56 does not stop immediately and goes further a predetermined distance. The control unit 45 calculates a distance at which the toggle support 56 went further, i.e., a movement distance gap, through the clamping position sensor 42.

The control unit 45 performs the foregoing process repeatedly based on the number of repetitions inputted from the user to calculate a movement distance gap, and may determine an average value as a movement distance gap.

(2) Mold Clamping Operation

After calculating the movement distance gap in this way, the control unit 45 moves the toggle support 56 as a base plate backward through the mold thickness motor 41, and operates the clamping motor 46 to move the moveable platen 52 forward. When the clamping motor 46 operates in a forward direction, the ball screw shaft 59 rotates in a forward direction and moves forward. In keeping with this, the crosshead 60 moves forward, and the toggle link 57 operates so that the moveable platen 52 moves forward. The forward movement of the moveable platen 52 is intended to unfold the toggle link 57 by moving the moveable platen 52 forward in relation to the toggle support 56, and to apply the clamp force to the mold using a minimum of driving power, the toggle link 57 is required to be in unfolded state.

When the toggle link 57 becomes a maximum unfolded state, the mold thickness motor 41 operates to move the toggle support 56 forward until the moveable mold 51 mounted on the moveable platen 52 comes into contact with the fixed mold 53 mounted on the fixed platen 54. When a mold contact occurs in this way, the clamp force is set. A process of setting the clamp force is described below.

When the toggle link 57 is fully unfolded, and concurrently, the mold contact is made, the control unit 45 adjusts the clamping motor 46 based on the clamp force inputted form the user to move the moveable platen 52 backward a predetermined dimension. As a consequence, the toggle link 57 becomes a folded state at a predetermined amount. Subsequently, the mold thickness motor 41 operates to move the toggle support 56 forward a predetermined dimension. In this instance, the control unit 45 determines a value obtained by deducting the calculated movement distance gap from the fold amount of the toggle link inputted form the user as a target movement distance of the toggle support 56, and moves the toggle support 56 forward. That is, the control unit 45 drives the mold thickness motor 41 to move the toggle support 56 forward, compares a measurement value of the clamping position sensor 42 as an encoder which detects the number of rotations of the mold thickness motor 41 to the target movement distance, and when the toggle support 56 moved forward the target movement distance, stops the operation of the mold thickness motor 41. Even though the mold thickness motor 41 is stopped, the toggle support 56 does not stop immediately and goes further a predetermined distance. That is when the fold amount of the toggle link is 1 mm and the movement distance gap is 0.2 mm, if the toggle support 56 moved to 0.8 mm, the control unit 45 stops the mold thickness motor 41, but the toggle support 56 moves forward 1 mm.

Subsequently, in a state that the toggle support 56 is stopped, when the toggle link 57 is unfolded to the maximum by adjusting the clamping motor 46, the tie bars 55 fixed to the toggle support 56 and the fixed platen 54 are stretched, and in this instance, a clamp force is produced by a restoration force of the tie bars 55.

(3) Injection Operation

Subsequently, when the screw 23 is rotated inside the heating cylinder 21, resin pellets which are a molding material supplied from the hopper 22 are melted by the heater 21a installed on the heating cylinder 21. The melted resin is gathered at a front end of the screw 23, and then, is injected from a nozzle of a front end of the heating cylinder 21 and filled in a cavity space formed within the molding unit 70. To perform mold opening, the clamping motor 46 operates in a backward direction to rotate the ball screw shaft 59 in a backward direction. In keeping with this, the crosshead 60 moves backward, and the toggle link 57 operates so that the moveable platen 52 moves backward.

Figure 2:
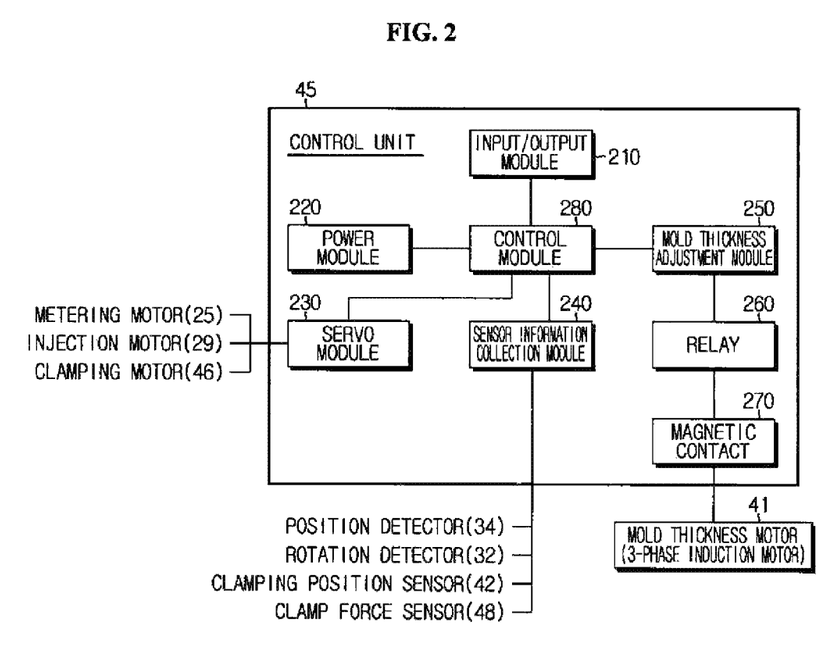
FIG. 2 is a diagram illustrating component of a control unit of FIG. 1.

FIG. 2 is a diagram illustrating the component of the control unit of FIG. 1. Referring to FIG. 2, the control unit 45 includes an input/output module 210, a power module 220, a servo module 230, a sensor information collection module 240, a mold thickness adjustment module 250, a relay 260, a magnetic contact 270, and a control module 280.

The input/output module 210 includes a keyboard, a mouse, and a touch panel, and performs input and output of data between the user and the control unit 45. In the case of the touch panel, liquid crystal display (LCD) technology or light emitting polymer display (LPD) technology may be used, and the touch panel display may be a capacitive touch display, a resistive touch display, an infrared touch display. The touch display provides an output interface and an input interface between the control unit 45 and the user. The touch display displays a visual output to the user. The visual output may include a text, graphics, a video, and any combination thereof. The touch display defines a touch sensing surface where a user input is received. In this embodiment, the input/output module 210 receives an input of the number of repetitions and a fold amount of the toggle link for calculating a movement distance gap from the user, and transmits the same to the control module 280.

The power module 220 supplies power to the control unit 45, and the servo module 230 is connected to the metering motor 25, the injection motor 29, and the clamping motor 46 of the injection molding machine, and outputs a motor driving signal under the control of the control module 280. The sensor information collection module 240 collects information associated with the number of rotations or an amount of rotation of the metering motor 25 from the rotation detector 32 of the injection molding machine, collects information associated with the number of rotations or an amount of rotation of the injection motor 29 from the position detector 34, and collects information associated with the number of rotations or an amount of rotation of the mold thickness motor 41 from the clamping position sensor 42.

When it is necessary to adjust a mold thickness, the mold thickness adjustment module 250 supplies current to the relay 260 to turn on the relay 260 under the control of the control module 280, and when the mold thickness adjustment is completed, turns off the relay 260. The relay 260 is a switch which is opened and closed when the input reaches a certain value, and as the relay 260 is opened and closed based on the current received from the mold thickness adjustment module 250, the relay 260 transmits the current to the magnetic contact 270. The magnetic contact 270 is a magnetic switch, and supplies power to the mold thickness motor 41 which is a 3-phase induction motor or blocks the power supply.

The control module 280 controls the overall operation of the control unit 45. In a metering process, the control module 280 transmits a driving signal to the metering motor 25 through the servo module 230 to rotate the screw 23 within the heating cylinder 21 to fill the heating cylinder 21 with resin pellets, i.e., a molding material. Also, in a mold clamping operation, the control module 280 transmits a driving signal to the clamping motor 46 through the servo module 230 to move the crosshead 60 forward/backward to operate the toggle link 57. Also, in an injection process, the control module 280 transmits a driving signal to the injection motor 29 through the servo module 230 to move the screw 23 within the heating cylinder 21 forward to inject melted resin into a cavity space within the mold 52 and 54. In the metering, mold clamping, and injection processes, the control module 280 controls each process using the information collected by the sensor information collection module 240.

For precise clamp force setting when setting the clamp force, the control module 280 calculates a movement distance gap of the toggle support 56, and sets a clamp force using the calculated movement distance gap.

The control module 280 receives an input of the number of repetitions and a fold amount of the toggle link for calculating a movement distance gap from the user through the input/output module 210. Here, the fold amount of the toggle link refers to a distance at which the toggle link 57 is folded and unfolded when setting the clamp force, and is determined based on the clamp force. For example, when the clamp force is 30 tons, the fold amount of the toggle link may be 1 mm.

The control module 280 calculates a position to which the toggle support 56 will move based on the fold amount of the toggle link. That is, the control module 280 receives information associated with a current position of the toggle support 56 from the clamping position sensor 42 through the sensor information collection module 240, and calculates a value obtained by adding the fold amount of the toggle link to the current position as a target movement position. When the position is calculated with respect to the fixed mold 53, the target movement position is calculated as a value obtained by deducting the fold amount of toggle link from the current position.

The control module 280 supplies power to the mold thickness motor 41 which is a 3-phase induction motor through the mold thickness adjustment module 250 to move the toggle support 56 forward, and receives information associated with the position of the toggle support 56 from the clamping position sensor 42 through the sensor information collection module 240. The control module 280 compares the received position to the target movement position, and when the toggle support 56 reaches the target movement position, blocks the power supply to the mold thickness motor 41 through the mold thickness adjustment module 280 to stop the operation of the mold thickness motor 41.

Even though the mold thickness motor 41 is stopped, the toggle support 56 does not stop immediately and goes further to a predetermined distance. The control module 280 receives information associated with the position of the toggle support 56 from the clamping position sensor 42 through the sensor information collection module 240, and calculates the distance at which the toggle support 56 went further, i.e., a movement distance gap. The control module 280 performs the foregoing process based on the number of repetitions inputted from the user through the input/output module 210 to calculate a movement distance gap, and may determine an average value as a gap in movement amount.

After calculating the movement distance gap as described in the foregoing, the control module 280 drives the mold thickness motor 41 through the mold thickness adjustment module 250 to move the toggle support 56 backward and then drives the clamping motor 46 through the servo module 230 to move the moveable platen 52 forward. When the toggle link 57 becomes a maximum unfolded state, the control module 280 drives the mold thickness motor 41 to move the toggle support 56 forward until the moveable mold 51 mounted on the moveable platen 52 comes into contact with the fixed mold 53 mounted on the fixed platen 54. When a mold contact occurs in this way, the clamp force is set.

Specifically, when the toggle link 57 is fully unfolded, and concurrently, the mold contact is made, the control module 280 adjusts the clamping motor 46 through the servo module 230 based on the clamp force inputted from the user to move the moveable platen 52 backward a predetermined dimension. As a consequence, the toggle link 57 becomes a folded state at a predetermined amount. Subsequently, the control module 280 drives the mold thickness motor 41 through the mold thickness adjustment module 250 to move the toggle support 56 forward a predetermined dimension. In this instance, the control module 280 determines a value obtained by deducting the calculated movement distance gap from the fold amount of the toggle link inputted form the user as a target movement distance of the toggle support 56, and moves the toggle support 56 forward. That is, the control module 280 drives the mold thickness motor 41 to move the toggle support 56 forwards, compares a measurement value of the clamping position sensor 42 as an encoder which detects the number of rotations of the mold thickness motor 41 to the target movement distance, and when the toggle support 56 moved forward the target movement distance, stops the operation of the mold thickness motor 41. Even though the mold thickness motor 41 is stopped, the toggle support 56 does not stop immediately and goes further to a predetermined distance. That is, where the fold amount of the toggle link is 1 mm and the movement distance gap is 0.2 mm, if the toggle support 56 moved to 0.8 mm, the control module 280 stops the mold thickness motor 41, but the toggle support 56 moves forward 1 mm. Subsequently, the control module 280 blocks the power supply to the mold thickness motor 41 to stop the toggle support 56, and adjusts the clamping motor 46 through the servo module 230 to unfold the toggle link 57 to the maximum. Thus, as the tie bars 55 fixed to the toggle support 56 and the fixed platen 54 are stretched, and in this instance, a clamp force is produced by a restoration force of the tie bars 55.

Figure 3:
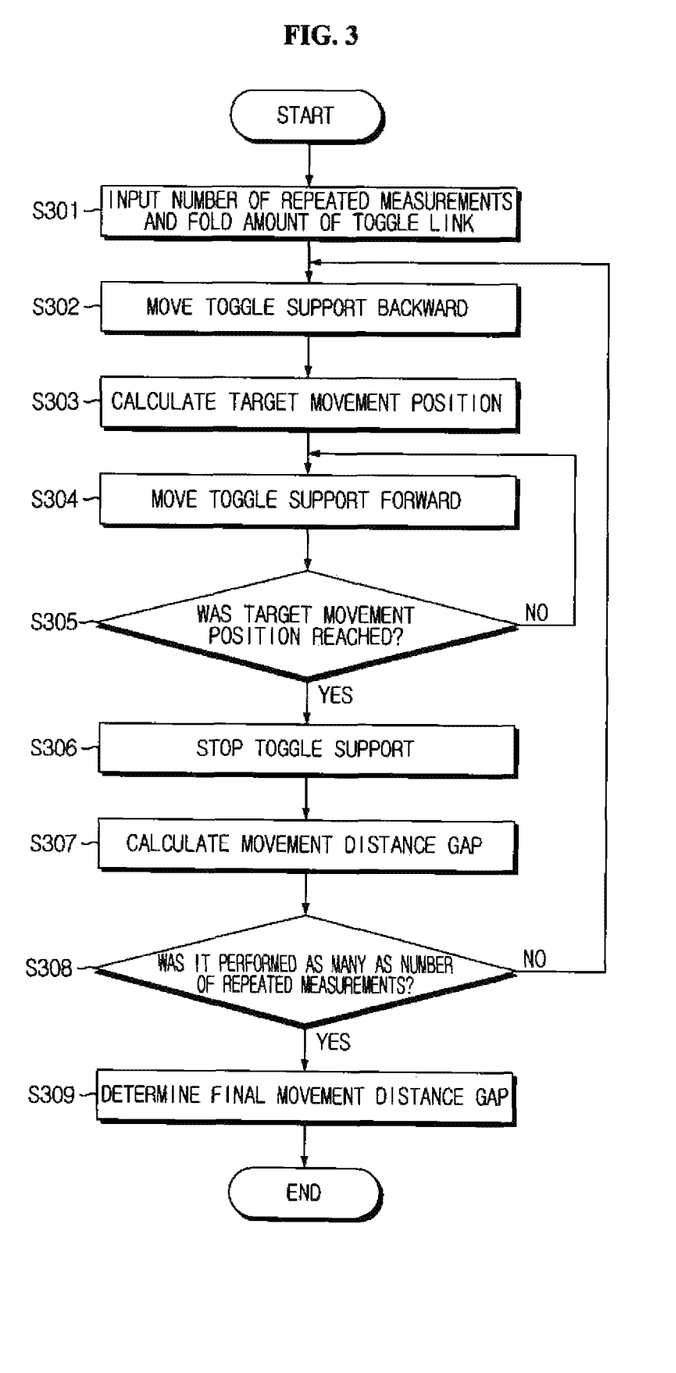
FIG. 3 is a flowchart illustrating a method of calculating a movement distance gap of a clamping unit of an injection molding machine according to an exemplary embodiment of the present disclosure.

FIG. 3 is a flowchart illustrating a method of calculating the movement distance gap of the clamping unit of the injection molding machine according to an exemplary embodiment of the present disclosure.

Referring to FIG. 3, first, the control unit 45 receives an input of the number of repeated measurements and a fold amount of the toggle link through an input means such as a touch panel, a keyboard, or a mouse (S301). Here, the fold amount of the toggle link refers to a distance at which the toggle link 57 is folded or unfolded when setting the clamp force, and is determined based on the clamp force. For example, when the clamp force is 30 tons, the fold amount of the toggle link may be 1 mm.

The control unit 45 drives the mold thickness motor 41 to move the toggle support 56 backward (S302). Here, the backward movement of the toggle support 56 is to provide an allowance to prevent a mold contact from occurring when moving the toggle support 56 forward to calculate a movement distance gap.

The control unit 45 calculates a target movement position of the toggle support 56 based on the fold amount of the toggle link (S303). That is, the control unit 45 receives information associated with a current position of the toggle support 56 from the clamping position sensor 42 and calculates a target movement position as a value obtained by adding the fold amount of the toggle link to the current position. Alternatively, where the position is calculated with respect to the fixed mold 53, the control unit 45 calculates a target movement position as a value obtained by deducting the fold amount of the toggle link from the current position.

The control unit 45 supplies power to the mold thickness motor 41 to move the toggle support 56 forward (S304). The control unit 45 receives information associated with the position of the toggle support 56 from the clamping position sensor 42 and compares the position of the toggle support 56 to the target movement position (S305).

When the toggle support 56 reaches the target movement position, the control unit 45 blocks the power supply to the mold thickness motor 41 to stop the operation of the mold thickness motor 41 to stop the movement of the toggle support 56 (S306).

Even though the mold thickness motor 41 is stopped, the toggle support 56 does not stop immediately, and goes further to a predetermined distance. The control unit 45 receives information associated with the position of the toggle support 56 from the clamping position sensor 42 and calculates the distance at which the toggle support 56 went further, i.e., a movement distance gap (S307).

The control unit 45 determines whether the movement distance gap was calculated as many as the number of repeated measurements inputted at S301 (S308), and when there are some measurements left, performs the foregoing process again to additionally calculate a movement distance gap. After calculating the movement distance gap in this way, the control unit 45 determines a final movement distance gap (S309). That is, when the number of measurements is one time, a movement distance gap measured at the first time is determined as a final movement distance gap, and when the number of measurements is twice or more, an average value of the movement distance gaps is determined as a final movement distance gap.

After determining the movement distance gap by the method described with reference to FIG. 3, the control unit 45 moves the toggle support 56 taking the movement distance gap into consideration when generating the clamp force in the mold clamping process.

As described hereinabove, the present disclosure may precisely control the mold thickness by use of a 3-phase induction motor without using a servo motor as the mold thickness motor 41.

Further, the present disclosure may precisely control the mold thickness at ease despite varying reduction ratios depending on the model of the mold thickness motor.

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. An injection molding machine comprising:
   a fixed platen on which a fixed mold is mounted;
   a moveable platen disposed facing the fixed platen and installed moveably forward and backward by a toggle link, the moveable platen on which a moveable mold is mounted facing the fixed mold;
   a base plate supporting the toggle link and installed moveably forward and backward;
   a driving part for mold clamping to operate the toggle link;
   a driving part for mold thickness adjustment to adjust a mold thickness by moving the base plate forward and backward in relation to the fixed platen; and
   a control unit to calculate a movement distance gap'before a clamping process by controlling the driving part for mold thickness adjustment to move the base plate backward and then move the base plate forward to a target movement position based on a fold amount of the toggle link determined by a clamp force, and control the driving part for mold thickness adjustment using a value obtained by deducting the movement distance gap from the fold amount of the toggle link when producing a clamp force.

2. The injection molding machine according to claim 1, wherein the control unit:
   calculates the movement distance gap as many as a predetermined number of times; and
   determines an average value as a final movement distance gap.

3. The injection molding machine according to claim 1, wherein the control unit:
   turns on the driving part for mold thickness adjustment to move the base plate forward to the target movement position; and
   when the base plate reaches the target movement position, turns off the driving part for mold thickness adjustment and determines a difference between a current position of the base plate and the target movement position as the movement distance gap.

4. The injection molding machine according to claim 1, wherein:
   the driving part for mold thickness adjustment is, a 3-phase induction motor; and
   the control unit collects measured information from a sensor which measures a number of rotations of the 3-phase induction motor, and calculates a position of the base plate.

5. The injection molding machine according to claim 4, wherein the control unit controls the 3-phase induction motor by supplying power to the 3-phase induction motor or blocking the power supply through a magnetic contact.

6. The injection molding machine according to claim 1, wherein the control unit:
   controls the driving part for mold clamping and the driving part for mold thickness adjustment to fully unfold the toggle link so that the moveable mold comes into contact with the fixed mold and the toggle link becomes a folded state at a predetermined amount; and controls the driving part for mold thickness adjustment to move the base plate forward as much as a value obtained deducting the movement distance gap from the fold amount of the toggle link to produce a clamp force.

7. A mold thickness control method for an injection molding machine comprising a fixed platen on which a fixed mold is mounted, a moveable platen which is disposed facing the fixed platen and installed moveably forward and backward by a toggle link and on which a moveable mold is mounted facing the fixed mold, and a base plate which supports the toggle link and is installed moveably forward and backward, the mold thickness control method comprising:

receiving from a user an input of a fold amount of the toggle link determined by a clamp force;

before a clamping process, calculating a movement distance gap by moving the base plate backward and moving the base plate forward to a target movement position based on the fold amount of the toggle link; and     when producing a clamp force, moving the base plate forward using a value obtained by deducting the movement distance gap from the fold amount of the toggle link.

8. The mold thickness control method according to claim 7, wherein the calculating comprises:

calculating the movement distance gap as many as a predetermined number of times; and     determining an average value as a final movement distance gap.

9. The mold thickness control method according to claim 7, wherein the calculating comprises:

turning on the driving part for mold thickness adjustment which moves the base plate forward and backwards, to move the base plate backward and then move the base plate forward to the target movement position;

turning off the driving part for mold thickness adjustment when the base plate reaches the target movement position; and     determining a difference between a current position of the base plate after turned off and the target movement position as the movement distance gap.

10. The mold thickness control method according to claim 7, wherein the calculating and the moving forward comprises:

moving the base plate using a 3-phase induction motor; and     collecting measured information from a sensor which measures a number of rotations of the 3-phase induction motor, and calculating a position of the base plate.

11. The mold thickness control method according to claim 10, wherein the 3-phase induction motor is controlled by supplying power to the 3-phase induction motor or blocking the power supply through a magnetic contact.

12. The mold thickness control method according to claim 7, wherein the moving forward comprises:

fully unfolding the toggle link, so that the moveable mold comes into contact with the fixed mold;

controlling the toggle link so that the toggle link becomes a folded state at a predetermined amount; and     moving the base plate forward as much as a value obtained deducing the movement distance gap from the fold amount of the toggle link to produce a clamp force.

\* \* \* \* \*